United States Patent [19]

Mandt

[11] Patent Number: 4,618,426
[45] Date of Patent: Oct. 21, 1986

[54] RETRIEVABLE JET MIXING SYSTEMS

[76] Inventor: Mikkel G. Mandt, 2309 Grand Blvd., Cedar Falls, Iowa 50613

[21] Appl. No.: 762,038

[22] Filed: Aug. 2, 1985

Related U.S. Application Data

[63] Continuation of Ser. No. 565,021, Dec. 22, 1983, abandoned.

[51] Int. Cl.⁴ ............................................. C02F 3/02
[52] U.S. Cl. ............................ 210/620; 210/626; 210/629; 210/220; 210/234; 210/236; 210/237; 210/258; 210/416.1; 261/93; 261/DIG. 75
[58] Field of Search ............ 210/620, 626, 627, 628, 210/629, 220, 234, 236, 237, 238, 258, 416.1, 416.2; 261/93, 120, DIG. 75

[56] References Cited

U.S. PATENT DOCUMENTS

| | | | |
|---|---|---|---|
| 2,650,810 | 9/1953 | Nordell | 210/237 |
| 3,365,178 | 1/1968 | Bood | 261/DIG. 75 |
| 3,442,387 | 5/1969 | Berardi | 210/220 |
| 3,671,022 | 6/1972 | Laird | 210/220 |
| 3,834,536 | 9/1974 | Kelsey | 210/220 |
| 4,210,534 | 7/1980 | Molvar | 261/DIG. 75 |
| 4,216,091 | 8/1980 | Mineau | 210/220 |
| 4,235,720 | 11/1980 | Nakajima | 210/220 |
| 4,242,289 | 12/1980 | Blum | 210/220 |
| 4,268,398 | 5/1981 | Shuck | 210/220 |
| 4,329,227 | 5/1982 | Todd | 210/237 |

FOREIGN PATENT DOCUMENTS

| | | | |
|---|---|---|---|
| 740771 | 1/1970 | Belgium | 210/220 |
| 7900895 | 11/1979 | World Int. Prop. O. | 210/220 |
| 942754 | 11/1963 | United Kingdom | 261/DIG. 75 |
| 1459418 | 12/1976 | United Kingdom | 210/220 |

Primary Examiner—Ernest G. Therkorn
Attorney, Agent, or Firm—Fitch, Even, Tabin & Flannery

[57] ABSTRACT

Apparatus for jet aeration of wastewater which may be readily retrieved for cleaning or other servicing and replaced in service. Methods of placing the aeration apparatus in service are also provided.

14 Claims, 8 Drawing Figures

RETRIEVABLE JET MIXING SYSTEMS

This application is a continuation of application Ser. No. 565,021 filed Dec. 22, 1983, now abandoned.

The present invention is directed to methods and apparatus for wastewater treatment, and more particularly, to such methods and apparatus which may be utilized in the aeration of wastewater liquids and which may be readily retrieved, serviced and replaced in operation.

Methods and apparatus for the aerobic treatment of wastewater such as industrial waste, sewage and the like conventionally utilize oxygenation to promote the rapid aerobic growth of microorganisms and the concommitant oxidation and consumption of particulate and dissolved effluent waste components. Such aerobic wastewater treatment systems may conventionally utilize various types of aeration enhancing apparatus such as a jet aeration apparatus for introducing oxygen into the wastewater liquid and for transferring momentum to the wastewater liquid to maintain mixing and to prevent sedimentation of particulate wastes and microbiological agglomerates.

In the operation of jet aeration systems, typically a motive stream jet of the waste liquid is mixed in a mixing chamber with an oxygen containing gas as a secondary fluid and discharged by means of a suitable discharge nozzle as a mixed gas-liquid stream into and below the surface of the wastewater to be aerated. Typically, the jet aeration apparatus including associated piping for pressurized air is solidly assembled and mounted near the bottom of the wastewater treatment basin.

While jet aeration systems are very effective for wastewater treatment, solid materials such as stones, plastic wastes or particulate materials may clog the mixing chambers, pump, and/or the discharge orifices of the jet aeration apparatus. Moreover, because of the active biological nature of the treatment system, it may be necessary or desirable to periodically remove biological growth which adheres to the surfaces of the aeration apparatus.

Conventionally, it has been necessary to periodically drain the aeration tankage, to utilize divers and/or to produce a reverse fluid flow through the system in order to manually clean and service the equipment. These methods have various disadvantages, and are not wholly adequate or desirable for maintainance of jet aeration systems.

Accordingly, it is an object of the present invention to provide improved methods and apparatus for aerating wastewater basins which may be readily cleaned or otherwise serviced without interruption of the operation of the wastewater treatment basin.

BRIEF DESCRIPTION OF THE DRAWINGS

These and other objects of the invention will become more apparent from the following detailed description and the accompanying drawings of which.

Generally in accordance with the present invention, methods and apparatus are provided for wastewater treatment by aeration. In accordance with various apparatus aspects of the present invention, wastewater aeration apparatus is provided comprising a wastewater treatment reservoir means for retaining the wastewater to be aerated, an air delivery means for providing an oxygen containing gas such as air comprising an upstanding conduit affixed at a predetermined position within the reservoir means, a retrievable jet aerator means comprising a motive fluid pump means for providing at least one primary motive stream of liquid wastewater from within the reservoir means and a jet mixing nozzle means for combining said at least one primary motive stream with a secondary fluid and for discharging the combined primary motive liquid and secondary fluid into the wastewater contained in the reservoir.

The jet mixing nozzle means further comprises a secondary fluid inlet conduit means for receiving the upstanding conduit of the air delivery means such that oxygen containing gas released by the upstanding conduit is directed into the secondary fluid inlet conduit. Further in accordance with various aspects of apparatus in accordance with the present invention, guide and support means are provided for guiding the retrievable jet aerator means into predetermined position within reservoir such that the secondary fluid inlet conduit means hydrostatically encloses the discharge orifice of the upstanding air delivery conduit, for supporting the retrievable jet aerator means in jet aeration operation at said predetermined position, and for permitting withdrawal of the jet aerator means from the reservoir for servicing.

Also in accordance with various aspects of the present invention, methods are provided for retrievably assembling a wastewater aeration system. In accordance with such methods, an air source having an upstanding discharge pipe is provided at a predetermined location within a wastewater treatment basin, and a jet aeration assembly having a downwardly directed secondary fluid inlet conduit is retrievably positioned over the discharge orifice of the gas discharge pipe, such that a hydrostatic head of at least about 1 inch of water is provided between the discharge orifice and the highest elevation of the secondary fluid inlet orifice. The jet aeration assembly thus positioned may be readily removed, serviced and replaced.

DETAILED DESCRIPTION OF THE DRAWINGS

Figure 1:
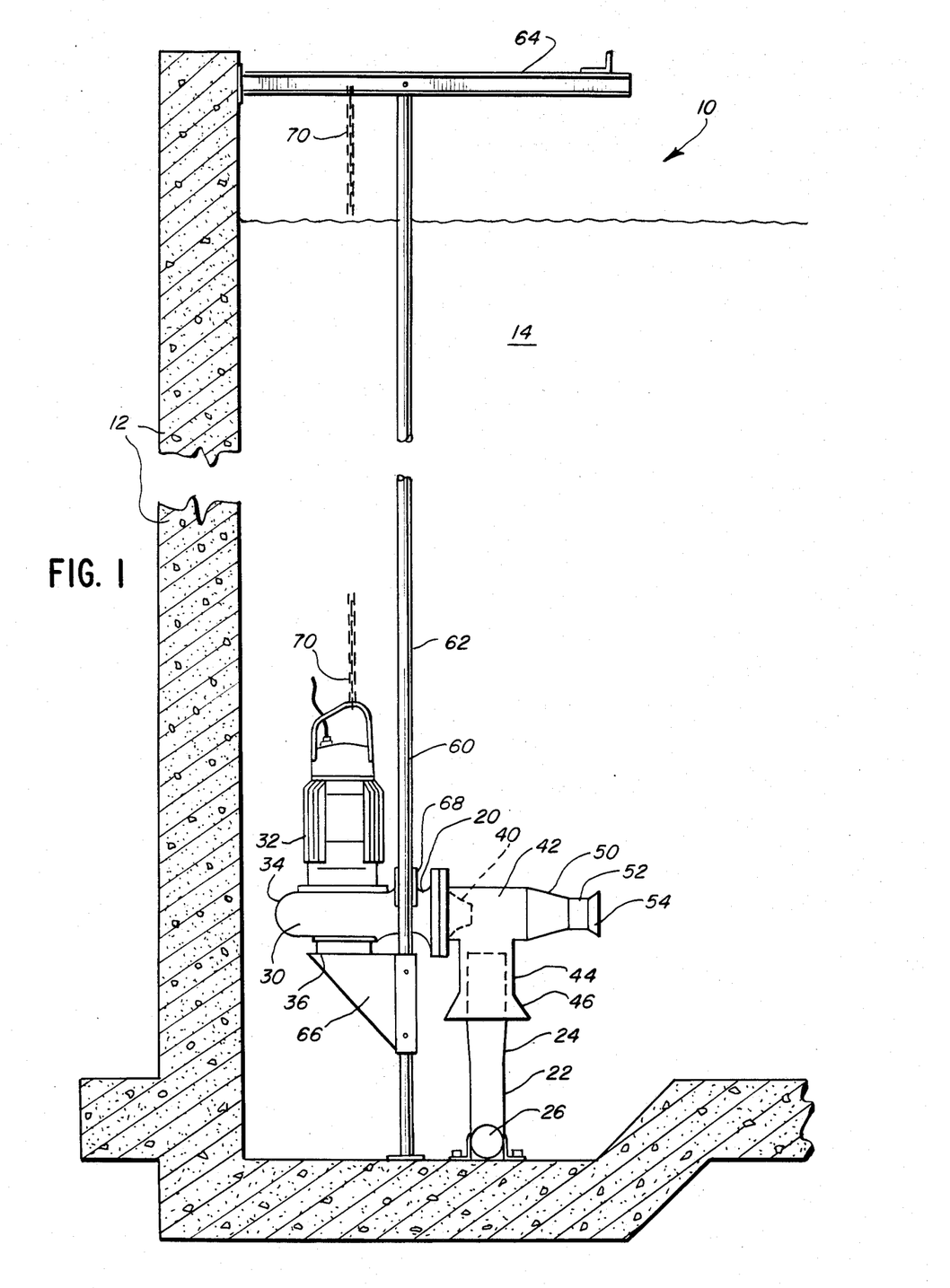
FIG. 1 is a cross-sectional partially transparent side view of an embodiment of retrievable aeration apparatus in accordance with the present invention.

Illustrated in FIG. 1 is an embodiment 10 of apparatus for treating wastewater which is constructed in accordance with various aspects of the present invention. As illustrated in FIG. 1, the wastewater aeration treatment apparatus 10 comprises reservoir means 12 for retaining the body of wastewater 14 to be aerated and a jet aeration system 20 including a retrievable pump and motive jet aeration assembly. The reservoir 12 may be constructed in accordance with conventional practice and will typically be tankage constructed of reinforced concrete. The illustrated jet aeration apparatus 20 comprises air supply means 22 for discharging a pressurized stream of air beneath the surface of the wastewater to be treated. In the illustrated embodiment, the air supply means 22 may comprise a suitable blower (not shown) located externally of the reservoir, an upstanding air supply pipe 24 of pretermined length and diameter as will be described in more detail hereinafter, and air supply conduit 26 connecting the blower and the upstanding air supply conduit. The air supply conduit 26 and pipe 24 may be suitably fabricated from wastewater resistant materials such as fiberglass reinforced polyester resin. The illustrated upstanding conduit 24 may have an external diameter of about 4 inches. The aeration apparatus 20 further comprises pump means 30 for providing a pressurized stream of waste liquid for utilization in the aeration apparatus. In the illustrated embodiment, the liquid pump means 30 is a submersible pump assembly comprising a submersible electric motor 32 and a centrifugal pump 34 integral therewith and having an intake orifice at the lower end thereof. Electrical power to the pump may be provided by a suitable electrical cable which does not interfere with the travel of the motor along the guide rails, as will be described in more detail. The pressurized discharge from the pump assembly 30 is forced through an elliptical nozzle 40 (shown by dotted lined in transparent view) into an enclosed mixing chamber 42. Also communicating with the enclosed mixing chamber 42 is a downwardly depending sleeve 44 terminating in an outwardly flared flange 46. As illustrated in FIG. 1, the sleeve 44 and flange 46 have a diameter which is greater than the diameter of the upstanding air supply pipe 24 such that the sleeve assembly 44, 46 may engage the upstanding air pipe 24 in telescoping relationship such that air released from the upstanding air delivery pipe 24 is directed into the mixing chamber 42. In this manner, a hydrostatic seal is provided having a pressure differential generally corresponding to the distance between the bottom opening of the flange 46 and the discharge orifice of the upstanding air conduit 24. This height may typically be between about one inch to about 20 inches, providing a corresponding hydrostatic pressure head for sealing the air delivery of 1–20 inches of water, and preferably from about 4 inches to about 10 inches. In the illustrated embodiment 20, the nominal hydrostatic seal provided is about 7 inches of water. The jet nozzle assembly illustrated in FIG. 1 further comprises a secondary nozzle assembly 50 which includes an inwardly flared converging section 50, a straight cylindrical throat section 52 connected at the downstream end of the converging section 50, and an outwardly flared discharge section 54 which may be connected to the downstream end of the straight section 52, and from which the jet mixture is discharged. The illustrated jet mixing system is a double nozzle assembly which may be used to combine, mix, or intimately contact two different fluids. The double nozzle assembly comprises a primary nozzle, a mixing chamber and a secondary nozzle assembly. The motive fluid, which in the illustrated embodiment is the waste liquid fluid from the tank, passes through the primary nozzle 40 creating a high velocity stream as it enters the mixing chamber, and the combined fluids are subsequently discharged from the second nozzle assembly 50, 52, 54. In operation, the action of the motive stream within the mixing chamber 42 may provide a hydrodynamic pressure seal component in addition to (or in lieu of) the hydrostatic pressure seal previously described. In this regard, the pressure within the mixing chamber 42 will depend in part on the relative volume and pressure of the air delivered to the mixing chamber. At relatively low delivery levels, a relative vacuum may be created with respect to stable pressure conditions, which may cause wastewater 14 to be drawn into the mixing chamber 42 along the zone defined between the inner surface of the secondary fluid inlet conduit 44 and the outer surface of the discharge pipe. Accordingly, this distance should desirably be less than the discharge orifice dimension to prevent nozzle clogging, although a deformable plastic webbing or filter element therebetween may accomplish this purpose. At higher relative gas to motive stream ratios, a positive pressure may be provided in the mixing chamber relative to the static pressure. Typically, the jet aeration apparatus may be operated with a slight positive pressure, which will not exceed the hydrostatic seal pressure provided by the vertical overlap of the secondary inlet conduit 44, 46 with the air pipe 24. The jet discharge from the nozzle assembly 50, 52, 54 creates secondary mixing patterns throughout the tank.

The illustrated jet nozzle assembly has no moving parts for ease of maintenance, and its smooth molded surfaces greatly reduce the potential for clogging of the nozzle assembly. In this regard, the nozzle assembly may be manufactured of structurally sound, corrosion resistant fiberglass reinforced polyester as a structural unit. Furthermore, as will now be described in more detail, the illustrated jet nozzle assembly is retrievable from the tankage. The secondary fluid enters the nozzle assembly through the bottom inlet without the necessity for a mechanical seal. The hydrostatic and hydrodynamic head created within the mixing chamber by the motive fluid forces the blended mixture out of the discharge nozzle 50, 52, 54 while sealing the suction connection at the secondary inlet assembly 44, 46.

The illustrated jet aeration assembly apparatus 20 further includes means 60 for guiding the retrievable jet aeration assembly in telescoping relationship with the upstanding air discharge pipe 24. The guiding means 60 in the illustrated embodiment comprises a pair of stainless steel guide rails, one of which is shown in FIG. 1 by reference numeral 62. The guide rails 62 are securely fastened to the bottom of the tank without obstructing the pump inlet orifice by appropriate fastening elements, and terminate above the water level with connection to a horizontally mounted framework 64. The guide rail assembly further includes a permanent platform 66 for supporting the weight of the motor, pump, and nozzle assembly at a predetermined distance above the bottom of the tank such that the upstanding air discharge pipe 24 projects into the downward projecting inlet port assembly 44, 46, a predetermined distance to provide a fluid seal, and without projecting into the mixing chamber so as to obstruct the flow of fluid within the chamber.

The pump assembly is further provided with guide elements 68 which interact in sliding relationship with the guide rail 62 and which permit the jet aeration assembly 20 to be raised and lowered along the rail 62 while restricting horizontal and rotational motion by the retrievable jet assembly. In this regard, the guide elements 68 extend less than 360° around the guide rail 62 so that the entire assembly may be withdrawn from the guide rails at the upper end of the guide rail assembly. When it is desired to remove the jet aeration assembly 20 from the tank, the assembly may be hoisted along the guide rail by means of chain 70 which is fastened to the motor assembly. So that solids or other debris do not lodge in the upstanding air pipe 24 while the jet aeration assembly 20 is being serviced, air discharge may be maintained through the discharge pipe 24 while the jet assembly is removed therefrom. The entire assembly may be removed from the guide rails simply by raising it above the support rail elements 64. After cleaning or other maintenance service upon the retrievable jet aeration apparatus, it may be lowered by means of the chain 70 along the guide rails until it is in the desired position for operation as shown in FIG. 1. In this regard, it will be appreciated that the guide rail system is adapted to direct the downwardly depending inlet sleeve assembly 44, 46 into overlapping relationship with the upstanding air delivery pipe 24. Moreover, the guide rail and support assembly 60 is adapted to support the weight of the jet assembly 20 in operation, and further to support the backward thrust directed by the assembly against the guide rail sleeve elements 68.

Figures 2, 8:
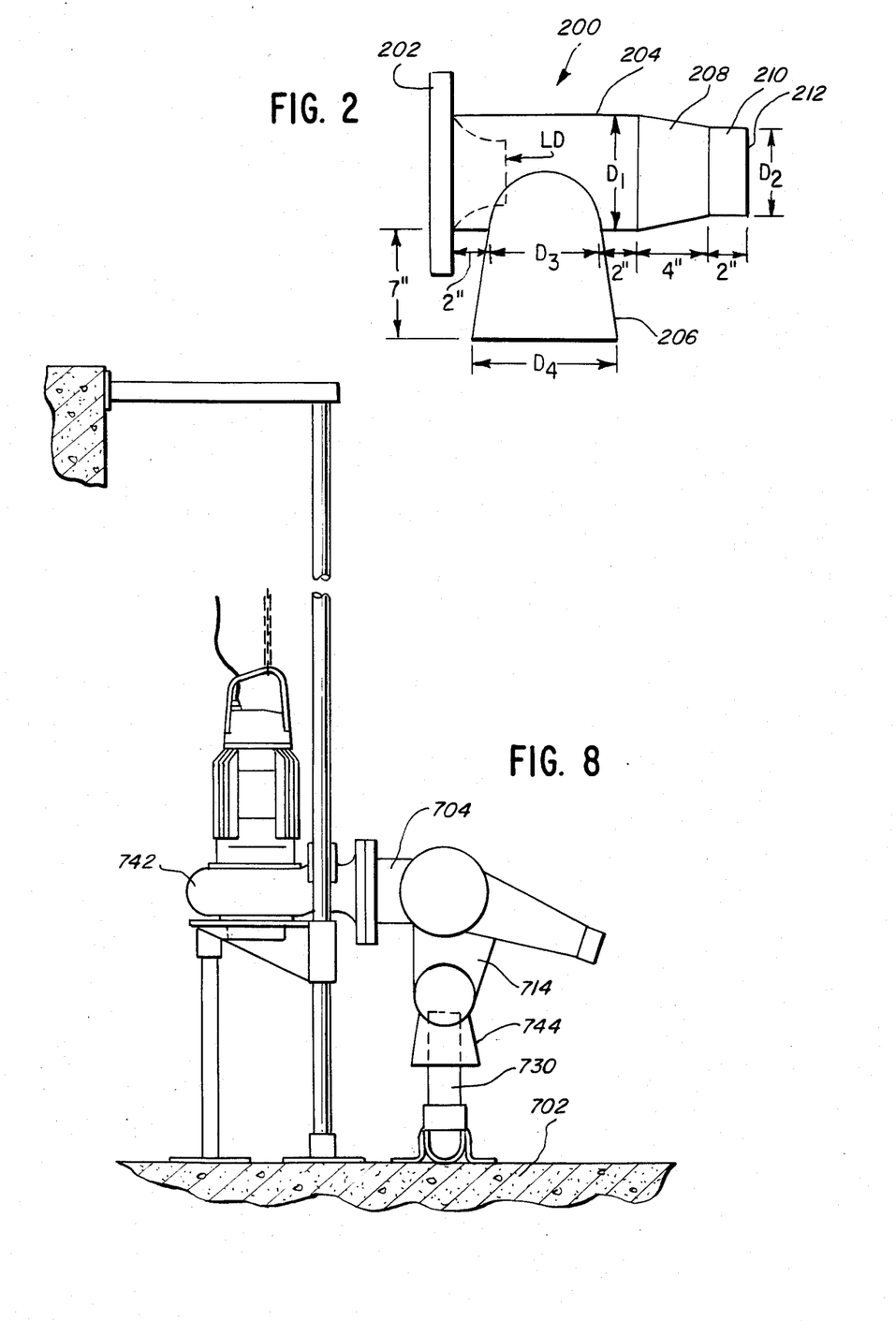
FIG. 2 is a partially transparent side view of an embodiment of an aeration nozzle assembly similar to that of FIG. 1.
FIG. 8 is a cross-sectional partially transparent side view of the retrievable multiple nozzle aeration apparatus of FIG. 7 taken through line 8—8.

As indicated, the interaction of the downwardly directed secondary inlet sleeve and the upwardly directed air pipe is an important feature of the apparatus of FIG. 1. In this connection, illustrated in FIG. 2 is an embodiment 200 of a nozzle assembly similar to that illustrated in FIG. 1 which illustrates the various dimensions of the embodiment 200, which is shown substantially to scale in the illustration of FIG. 2. The illustrated nozzle assembly is constructed in a unitary manner from smooth surfaced fiberglass reinforced polyester plastic and comprises a connection flange 202 for connection to the discharge of a suitable pressurize motive fluid source. The nozzle assembly further includes a right cylindrical mixing chamber section 204 having a diameter D1 of 6 inches, and an elliptical nozzle projecting thereinto and having a discharge diameter LD of 3.5 inches. Projecting downwardly from the mixing chamber cylinder 204 and in unobstructed communication therewith is a secondary fluid inlet flange 206 which has a diameter D3 at its intersection with the cylindrical mixing chamber section 204 of 6 inches, which is the same as that of the cylinder 204. The secondary fluid inlet flange projects downwardly from the mixing chamber cylinder 204 a distance of 7 inches in the illustrated embodiment, thereby providing for a hydrostatic head which may be introduced into the mixing chamber of approximately 7 inches of water. As further indicated on the drawing, the downwardly projecting secondary fluid inlet flange flares outwardly to an inlet diameter D4 of about 8 inches, to assist the telescopic insertion of a coacting upstanding air inlet pipe thereinto, which may have an outer diameter in the range of from about 4 to 5 inches. The illustrated mixing chamber cylinder 204 is 10 inches long with the downwardly depending secondary fluid inlet sleeve being centered along the mixing cylinder 204. At the downstream end of the mixing cylinder 204, a converging section 208 having a length of 4 inches and a downstream diameter D2 of 4.9 inches connects to a cylindrical float section 210 having a length of 2 inches, and an outlet discharge orifice D2 of 4.9 inches. In the illustrated embodiment 200, the secondary fluid inlet into the mixing chamber has a minimum cross sectional area which is substantially greater than the discharge cross sectional area of the discharge orifice 212.

Figure 3:
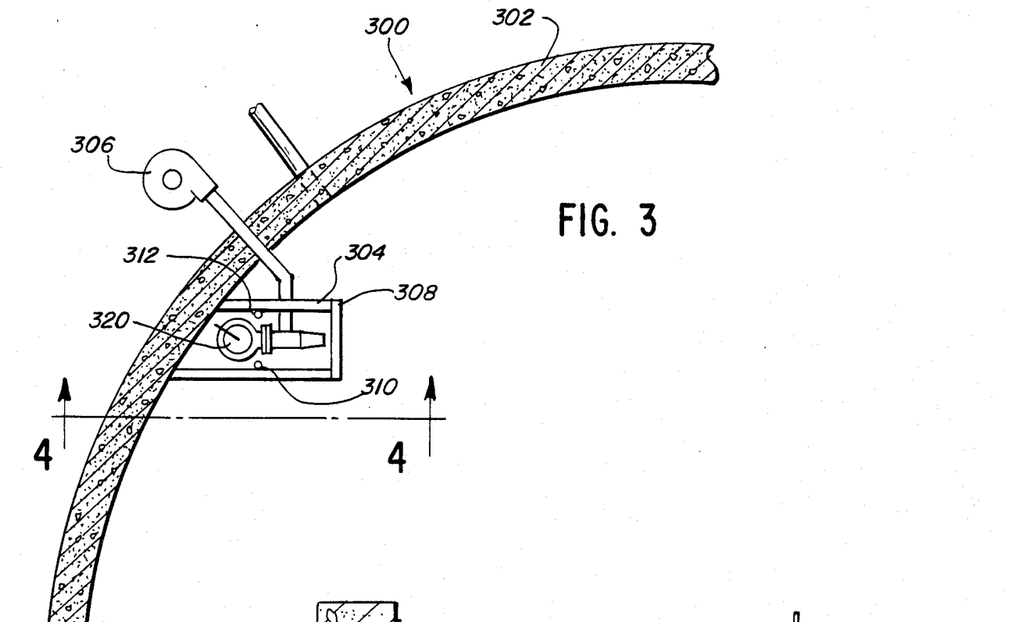
FIG. 3 is a plan view of a retrievable aeration apparatus in accordance with the present invention disposed with a sludge holding tank.
Figure 4:
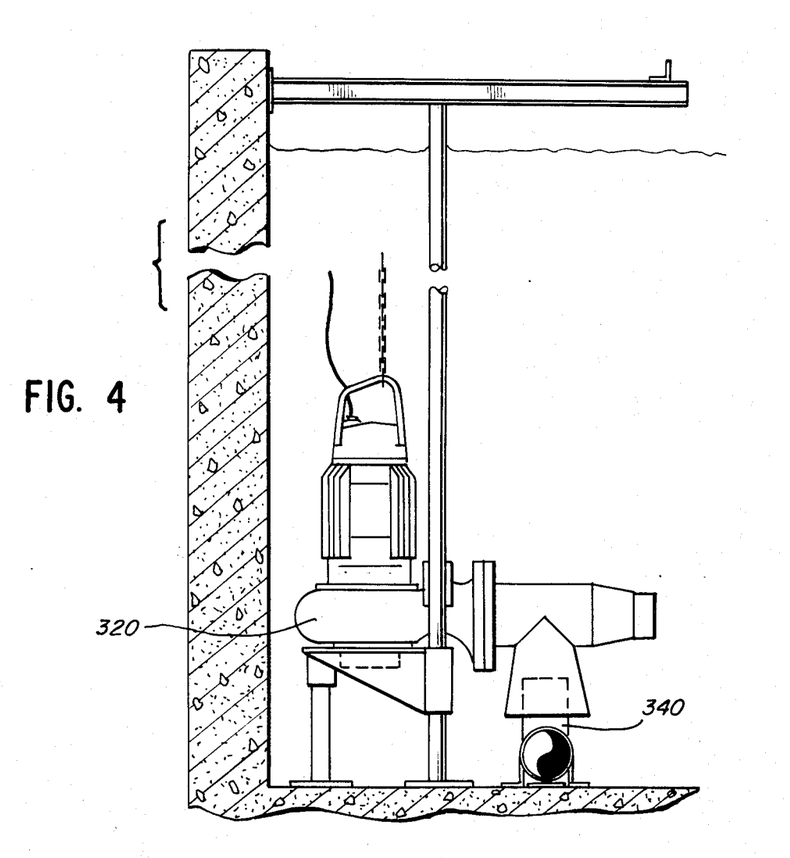
FIG. 4 is a cross-sectional partially transparent side view of the aeration apparatus of FIG. 4.

Various aspects of the present methods and apparatus may be embodied in a broad variety of configurations of wastewater treatment systems. In this regard for example, illustrated in FIG. 3 is a sludge holding tank aeration system 300 comprising a sludge holding tank 302 which may be suitably constructed of reinforced concrete, and a retrievable aeration apparatus 304. The illustrated aeration apparatus 304 comprises a blower 306 for providing pressurized air within the tank 302, an upper guide rail holding assembly 308 which is adapted to support guide rails 310, 312 and a submerged jet aeration appartus 320 which is shown in cross section in FIG. 4. The jet aeration apparatus 320 may be readily lifted along the guide rails 310, 312 and withdrawn from service for maintenance, inspection and cleaning. The blower 306 may be left in operation while the jet aeration appartus 320 is removed in order to prevent collection of sediment or other solids therein. In any event, the blower 306 may be turned on so that the upwardly extending pipe 340 may be cleared before guiding of the jet aeration assembly into telescoping relationship therewith. In operation, the guide rail assembly base support provides vertical support for the pump and nozzle assembly and provides horizontal thrust support for the backward thrust of the jet which is directed into the tankage fluid.

Figure 5:
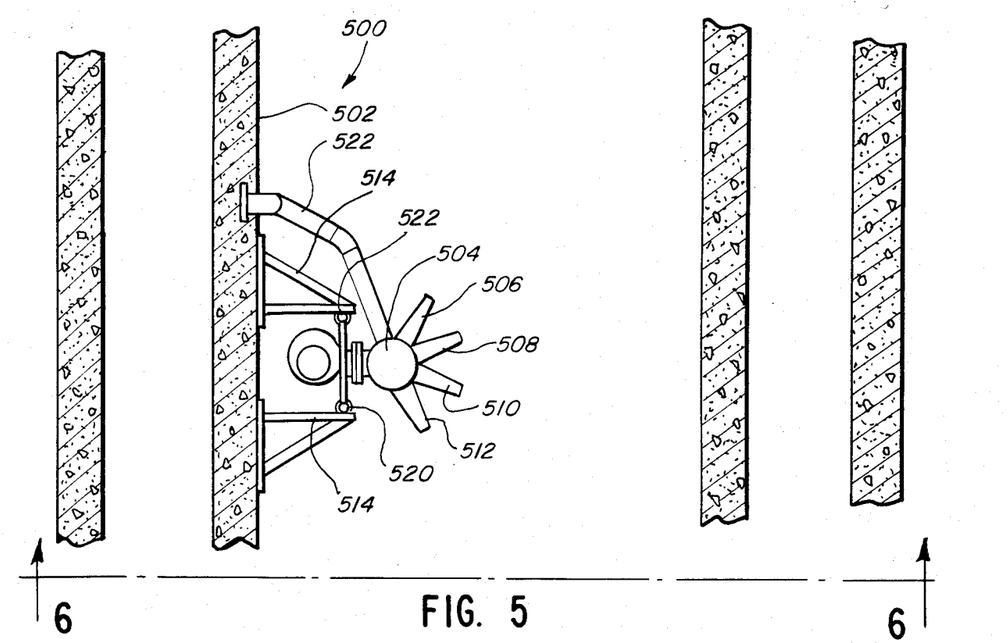
FIG. 5 is a plan view of a multiple nozzle retrievable aeration system disposed within a wastewater treatment tank.
Figure 6:
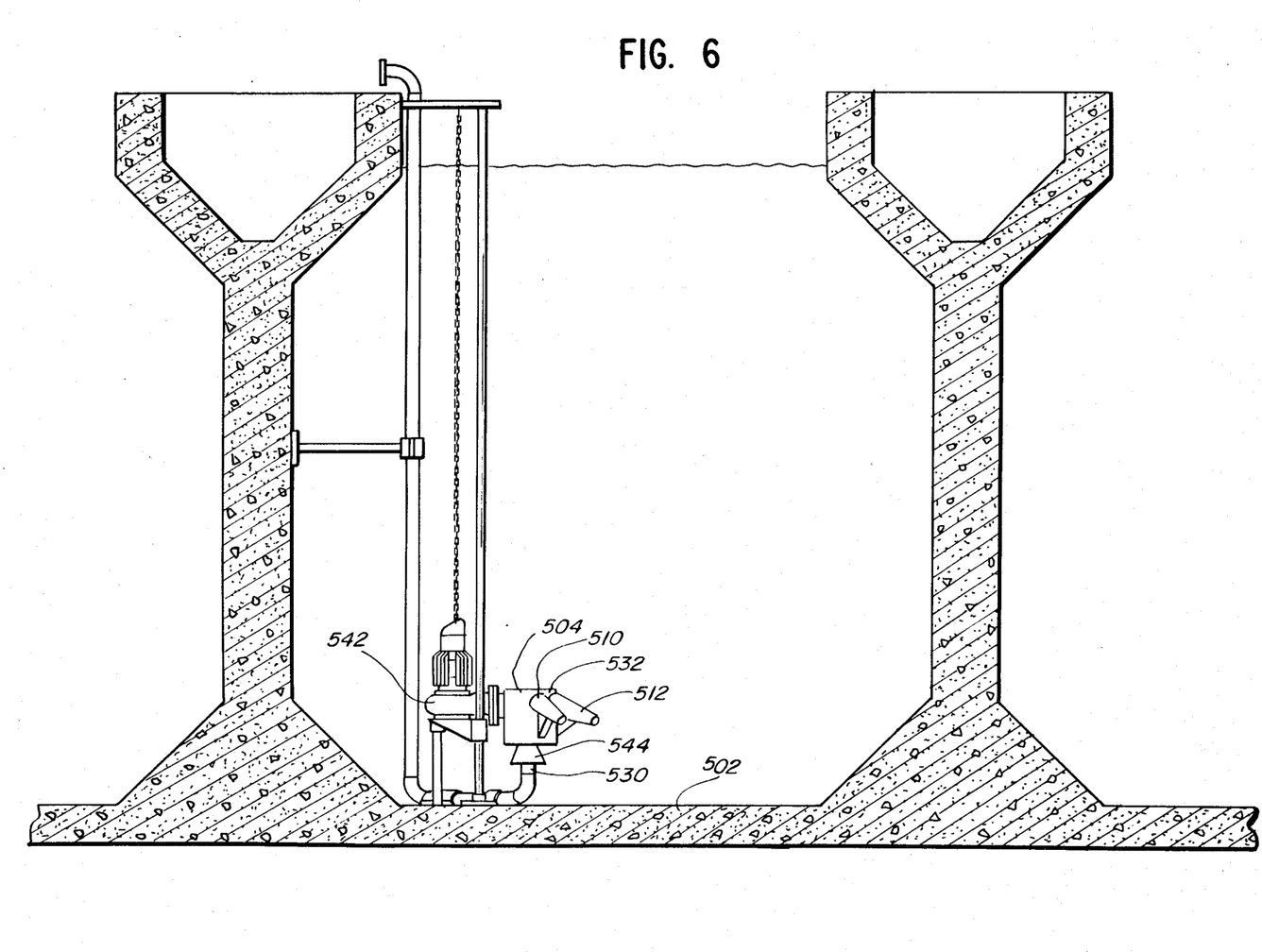
FIG. 6 is a cross-sectional partially transparent view of the retrievable multiple nozzle aeration apparatus of FIG. 5 taken through line 6—6.

The embodiments of FIGS. 1-4 utilize single nozzle jet aeration construction. Illustrated in FIGS. 5-8 are embodiments of treatment apparatus which utilize multiple discharge nozzle systems. In this connection, illustrated in FIGS. 5 and 6 is a wastewater treatment apparatus 500 which comprises a wastewater treatment tank 502 of plug flow design, and a retrievable jet aeration assembly 504 having a plurality of discharge nozzle elements 506, 508, 510, 512 having radially differing discharge directions. As illustrated in FIG. 5, the retrievable aeration assembly 504 comprises an above water guide rail support frame 514 which supports the vertically aligned guide rails 520, 522, particularly in respect to outwardly directed thrust, and are constructed in such a manner that the jet aerator assembly may be vertically lifted therefrom and removed for servicing. The system 500 further comprises a pressurized air inlet conduit 522 which may be connected at its upstream end to a suitable blower (not shown). As shown in FIG. 6, which is a cross sectional view taken through line 6—6 of FIG. 5, the pressurized air conduit 522 is firmly mounted at the bottom of the tank 502 and is provided with an upwardly projecting discharge conduit 530, which projects a predetermined distance from the bottom of the tank for appropriate interaction with the multiple nozzle jet aeration assembly 504. In this regard, the retrievable multiple nozzle jet aeration assembly is provided with a single submersible pump unit 542 and a single downwardly projecting sleeve 544 for making a hydrostatic seal with the upwardly projecting air pipe 530. The pressurized fluid from the pump 542 is directed through a multiple nozzle jet aeration structure 532, and the air introduced into the multiple nozzle assembly through downwardly projecting sleeve 544 is conducted in an appropriate manner to the multiple motive stream nozzles in accordance with conventional jet aeration technology. The combined primary and secondary fluid motive streams are discharged at an angle having a downward component into the wastewater to be aerated through the multiple orifices of nozzles 506, 508, 510 and 512.

Figure 7:
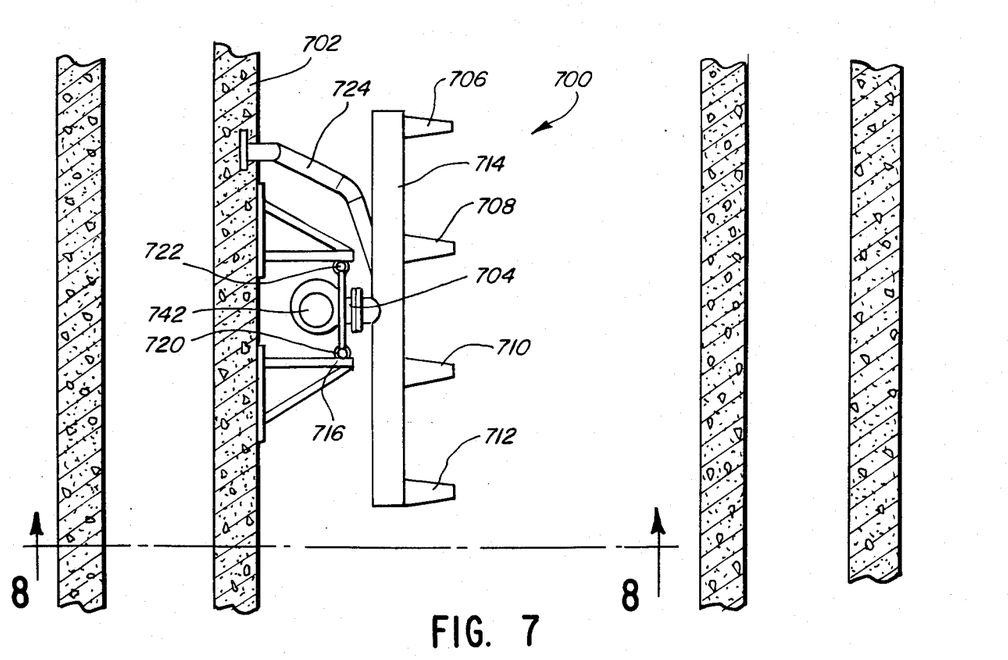
FIG. 7 is a plan view of another embodiment of a multiple nozzle retrievable multiple nozzle aeration appartus disposed within a wastewater treatment tank.

Illustrated in FIGS. 7 and 8 is a wastewater treatment apparatus 700 which comprises a wastewater treatment tank 702 of plug flow design, and a retrievable jet aeration assembly 704 having a plurality of discharge nozzle elements 706, 708, 710, 712 disposed along a common manifold 714. As illustrated in FIG. 5, the retrievable aeration assembly 704 comprises an above water guide rail support frame 716 which supports the vertically aligned guide rails 720, 722. The rails 720, 722 are constructed so that the jet aerator assembly may be vertically lifted therefrom and removed for servicing, as previously discussed. The system 700 further comprises a pressurized air inlet conduit 722 which may be connected at its upstream end to a suitable blower (not shown). As shown in FIG. 8, which is a cross sectional view taken through line 8—8 of FIG. 7, the pressurized air conduit 722 is firmly mounted at the bottom of the tank 702 and is provided with an upwardly projecting discharge conduit 730, which projects a predetermined distance from the bottom of the tank for appropriate interaction with the multiple nozzle jet aeration assembly 704 and manifold 714. In this regard, the retrievable multiple nozzle jet aeration assembly is provided with a single submersible pump unit 742 and a single downwardly projecting sleeve 744 for making a hydrostatic seal with the upwardly projecting air pipe 730. The pressurized fluid from the pump 742 is ultimately directed through multiple nozzles, and the air introduced into the multiple nozzle assembly through downwardly projecting sleeve 544 is conducted in an appropriate manner to the multiple motive stream nozzles in accordance with conventional jet aeration technology. The combined primary and secondary fluid motive streams are discharged downwardly into the tank through the multiple orifices of nozzles 506, 508, 510 and 512.

While the present invention has been particularly described with respect to certain specific embodiments, it will be appreciated that various modifications and alterations will become apparent from the present disclosure, which are intended to be within the scope of the present invention defined by the following claims.

What is claimed is:

1. Wastewater aeration apparatus comprising
a wastewater treatment reservoir means for retaining the wastewater to be aerated,
an air delivery means for providing an oxygen containing gas below the reservoir surface comprising an upstanding conduit affixed at a predetermined position within the reservoir means,
a retrievable jet aerator apparatus comprising a motive fluid pump means for providing at least one primary motive stream of liquid wastewater from within the reservoir means and a jet mixing nozzle means for combining said at least one primary motive stream with a secondary fluid and for discharging the combined primary motive stream and secondary fluid into the wastewater contained in the reservoir means, said jet mixing nozzle means further comprising a secondary fluid inlet conduit means for conducting a secondary fluid to said jet mixing nozzle means and for telescopically receiving said upstanding conduit of the air delivery means, and
guide and support means for guiding said retrievable jet aeration apparatus into a predetermined position within said reservoir with said secondary fluid inlet conduit projecting downwardly from said jet mixing nozzle means such that said secondary fluid inlet conduit means telescopically disengageably encloses the discharge orifice of said upstanding air delivery conduit, for supporting the retrievable jet aerator apparatus in jet aeration operation at said predetermined position, and for permitting withdrawal of the jet aerator apparatus from telescopic engagement with said upstanding conduit and from the reservoir for servicing.

2. Apparatus in accordance with claim 1 wherein said guide and support means comprises a plurality of guide rails and a support platform.

3. Apparatus in accordance with claim 2 wherein said guide and support means comprises two coplanar, vertical guide rails affixed at least at the bottom of said reservoir means, said two rails being positioned on respectively opposite sides of said retrievable jet aerator apparatus and such that said motive fluid pump means is positioned adjacent one side of the plane of said guide rails and said jet mixing nozzle means is positioned adjacent the opposite side of the plane of said guide rails.

4. Apparatus in accordance with claim 1 wherein said hydrostatic seal has a hydrostatic head in the range of from about 1 to about 20 inches of water.

5. Apparatus in accordance with claim 4 wherein said apparatus further includes a support base and wherein said guide and support means restricts horizontal and rotational motion of said retrievable jet aerator apparatus while permitting vertical movement upwardly from said support base of said retrievable jet aerator apparatus.

6. Apparatus in accordance with claim 1 wherein said secondary fluid input conduit flares outwardly over at least a portion of the length thereof to facilitate engagement with said gas discharge conduit.

7. Apparatus in accordance with claim 1 wherein said jet aerator apparatus comprises a plurality of discharge nozzles directed at different discharge angles into said reservoir.

8. Apparatus in accordance with claim 1 wherein said jet aerator apparatus comprises a plurality of discharge nozzles which discharge into the wastewater reservoir in substantially the same direction.

9. Wastewater apparatus in accordance with claim 1 wherein said secondary fluid inlet conduit means telescopically surrounds the discharge orifice of said upstanding air delivery conduit such that air released from said air delivery conduit is directed to said jet mixing means and said nozzle means and is confined within said secondary inlet fluid conduit by a hydrostatic head established between the downwardly depending secondary fluid inlet conduit means and the said discharge orifice of at least about one inch of water.

10. Apparatus in accordance with claim 1 wherein a filter element is provided between the secondary fluid inlet conduit and the upstanding discharge pipe.

11. A method for retrievably assembling a wastewater aeration system comprising the steps of providing a pressurized air source having an upstanding discharge pipe at a predetermined location within a wastewater treatment basis below the level of wastewater to be aerated therein, providing guide and support means for guiding a retrievable jet aerator assembly into a predetermined position within the wastewater treatment basis for supporting the jet aerator assembly in jet aeration operation at said predetermined position and for permitting withdrawl of the jet aerator assembly from the reservoir for servicing, retrievably positioning on said guide and support means a jet aerator assembly having a downwardly directed secondary fluid inlet conduit such that the conduit is telescopically disengageably positioned at said predetermined position over the discharge orifice of the gas discharge pipe to provide a hydrostatic head of at least about 1 inch of water between the lowest elevation of the discharge pipe orifice and the highest elevation of the secondary fluid inlet orifice providing at least one primary motive stream of liquid wastewater from within the wastewater treatment basin, combining said at least one primary motive stream in a jet mixing nozzles of said jet aerator assembly with secondary fluid from said secondary fluid inlet conduit, said secondary fluid comprising air discharge from said pressurized air source through said upstanding discharge pipe, and discharging the combined primary motive stream and secondary fluid into the waste water treatment basin below the level of wastewater to be aerated therein.

12. A method in accordance with claim 11 wherein said hydrostatic head is between about 4 and about 10 inches of water.

13. A method in accordance with claim 11 wherein said jet aerator is positioned by guiding along guide rails and is supported in position by a support platform.

14. A method in accordance with claim 13 wherein said jet aerator is removed from operating position by withdrawing it along guide rails for servicing.

* * * * *